US011972371B2

(12) United States Patent
Ahn et al.

(10) Patent No.: US 11,972,371 B2
(45) Date of Patent: Apr. 30, 2024

(54) HOTEL RESERVATION SYSTEM THAT PERFORMS PRICE COMPARISON

(71) Applicant: So Hyun Ahn, Seoul (KR)

(72) Inventors: So Hyun Ahn, Seoul (KR); Young Suk Jun, Seoul (KR)

( * ) Notice: Subject to any disclaimer, the term of this patent is extended or adjusted under 35 U.S.C. 154(b) by 63 days.

(21) Appl. No.: 17/835,745

(22) Filed: Jun. 8, 2022

(65) Prior Publication Data
US 2022/0398508 A1 Dec. 15, 2022

(30) Foreign Application Priority Data
Jun. 11, 2021 (KR) .................. 10-2021-0076159

(51) Int. Cl.
*G06Q 10/02* (2012.01)
*G06Q 50/12* (2012.01)

(52) U.S. Cl.
CPC ............. *G06Q 10/02* (2013.01); *G06Q 50/12* (2013.01)

(58) Field of Classification Search
CPC ............................... G06Q 10/02; G06Q 50/12
USPC .............................................................. 705/5
See application file for complete search history.

(56) References Cited

U.S. PATENT DOCUMENTS

| 2009/0030743 | A1* | 1/2009 | Tussy | G06Q 10/02 705/5 |
| 2019/0005389 | A1* | 1/2019 | Glyman | G06F 9/45558 |
| 2019/0035009 | A1* | 1/2019 | Williams | G06Q 50/12 |
| 2022/0067595 | A1* | 3/2022 | Zhu | G06Q 50/12 |

FOREIGN PATENT DOCUMENTS

| JP | 2006-172082 A | 6/2006 |
| KR | 10-2017-0009453 A | 1/2017 |
| KR | 10-1706889 B1 | 2/2017 |
| KR | 10-2018-0004088 A | 1/2018 |
| KR | 10-1979764 B1 | 5/2019 |

OTHER PUBLICATIONS

"Online Hotel Reservation System" Published by International Journal of Innovative Science, Engineering and technology (Year: 2014).*

* cited by examiner

*Primary Examiner* — Zeina Elchanti
(74) *Attorney, Agent, or Firm* — KORUS Patent, LLC; Seong Il Jeong

(57) ABSTRACT

The present invention can provide a hotel reservation system that searches for vacant rooms at lower prices even after making a reservation. A method of hotel reservation that is performed by a server, comprises steps of: obtaining identification information corresponding to vacant rooms of hotels from external servers; obtaining reservation information of a vacant room from a user terminal; transmitting to the user terminal whether a reservation is confirmed; searching for a first vacant room available within a predetermined period from a check-in date until before the check-in date; and providing a reservation change notification through the user terminal if determining the vacant room with the lower price than that of the reserved vacant room by comparing a price of the reserved vacant room and a price of the first vacant room that is available within the predetermined period.

1 Claim, 6 Drawing Sheets

HOTEL RESERVATION SYSTEM THAT PERFORMS PRICE COMPARISON

FIELD OF THE INVENTION

The present invention relates to a hotel reservation system that classifies vacant rooms of hotels by the same room, suggests a price for each vacant room, and searches for a vacant room with a price lower than that of a reserved vacant room.

BACKGROUND OF THE INVENTION

Since hotel data provided by each company and hotel vacant room rate data are different, it is becoming important to unify those data. In particular, as demands for using accommodations increase, and more and more customers make reservations for accommodations, importance of the accommodations is increasing. When making a reservation for accommodations, it is difficult for consumers to obtain accurate information they want as each company that brokers hotel reservations display the information including prices differently, even for the same hotel and same room.

Therefore, it is necessary to develop technology to find a lower price and notify it even after making a reservation since even the same hotel vacant room can be brokered with different prices. Currently, research on a hotel reservation method that provides customized vacant rooms to users in consideration of various factors as well as price is being actively conducted.

DETAILED DESCRIPTION OF THE INVENTION

Technical Problems

Accordingly, an object of the present invention is to solve the problems described above and to provide a hotel reservation system that searches and recommends vacant rooms at low prices even after making a reservation.

SUMMARY OF THE INVENTION

According to an embodiment of a method of hotel reservation that is performed by a server, the method of hotel reservation comprising steps of: obtaining reservation information of a vacant room from a user terminal; transmitting to the user terminal whether or not a reservation corresponding to the reservation information is confirmed; obtaining identification information corresponding to vacant rooms of a plurality of hotels from a plurality of external servers; searching for a first vacant room that is available within a predetermined period from a check-in date included in the reservation information based on the identification information until before the check-in date; and cancelling the reservation of the reserved vacant room, making a reservation of a vacant room with a lower price than that of the reserved vacant room, and providing a reservation change notification through the user terminal, if determining the vacant room with the lower price than that of the reserved vacant room by comparing a price of the reserved vacant room and a price of the first vacant room that is available within the predetermined period from the check-in date.

The step of providing a reservation change notification through the user terminal, if determining the vacant room with the lower price than that of the reserved vacant room by comparing a price of the reserved vacant room and a price of the first vacant room that is available within the predetermined period from the check-in date, may include steps of: determining a vacant room that is same as the reserved vacant room from among the first vacant room that is available within the predetermined period from the check-in date based on the identification information; and determining the vacant room with the lower price in such a way that if there is a penalty for canceling the reserved vacant room, a total of the price of the vacant room with the lower price and the penalty is lower than the price of the reserved vacant room.

The step of providing a reservation change notification through the user terminal, if determining the vacant room with the lower price than that of the reserved vacant room by comparing a price of the reserved vacant room and a price of the first vacant room that is available within the predetermined period from the check-in date, may include steps of: acquiring a location of a hotel reserved by a user; searching for a vacant room of a hotel located within a predetermined distance from the hotel reserved by the user from among the first vacant rooms that are available within the predetermined period from the check-in date, based on the identification information; determining second vacant rooms similar to the reserved vacant room reserved by the user within a predetermined similarity threshold; comparing a price of the reserved vacant room and prices of the second vacant rooms within the predetermined similarity threshold; and providing the reservation change notification through the user terminal if the price of the second vacant room within the predetermined similarity threshold is lower than the price of the reserved vacant room.

The step of comparing the price of the reserved vacant room and the prices of the second vacant rooms within the predetermined similarity threshold, may include steps of: obtaining review information of the second vacant rooms similar to the reserved vacant room within the predetermined similarity threshold from the plurality of external servers; setting ratings of the second vacant rooms similar to the reserved vacant room within the predetermined similarity threshold based on the review information; and comparing the price of the reserved vacant room and the prices of the second vacant rooms if the ratings are above a predetermined rating.

The step of searching for the first vacant room that is available within the predetermined period from the check-in date included in the reservation information based on the identification information until before the check-in date, may include steps of: searching for a third vacant room within a predetermined price range from the price of the reserved vacant room; obtaining a user's preference information; and scoring the reserved vacant room of the user and the third vacant room within the predetermined price range on a scale based on the preference information and providing a recommendation notification to the user terminal if a score of the third vacant room within the predetermined price range is higher than that of the reserved vacant room of the user.

TECHNICAL EFFECTS OF THE INVENTION

The present invention can improve customer satisfaction by assisting to make a reservation of a vacant room at a low price among the same rooms.

The present invention can improve user satisfaction by recommending a vacant room by reflecting a user's preference and user reviews.

BRIEF DESCRIPTION OF THE DRAWINGS

The accompanying drawings, which are included as part of the detailed description to assist understanding of the various embodiments, provide various embodiments and explain technical features of the various embodiments along with the detailed description.

DETAILED DESCRIPTION

Figure 1:
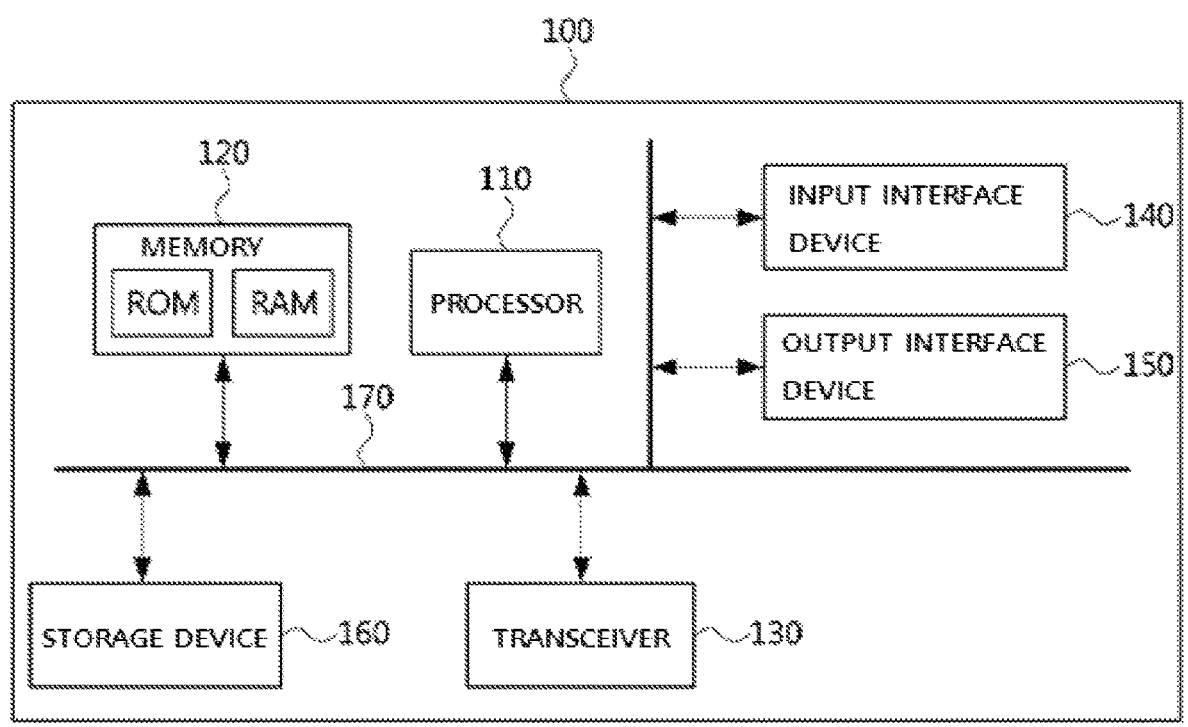
FIG. 1 is a diagram illustrating an operation of a processor according to an embodiment.

Since the present invention can have various modifications and embodiments, specific embodiments are illustrated in the drawings and described in detail in the description. However, this is not intended to limit the present invention to specific embodiments, it should be understood to include all modifications, equivalents, and substitutes included in the spirit and scope of the present invention. In describing each figure, like reference numbers have been used for like elements.

Although terms such as first, second, A, and B may be used to describe various elements, the elements should not be limited by the terms. The terms mentioned above are used only for the purpose of distinguishing one component from another. For example, a first component may be referred to as a second component without departing from the scope of the present invention, and similarly, a second component may also be referred to as a first component. The term "and/or" includes any combination of a plurality of related elements or any one of a plurality of the related elements When an element is referred to as being "connected" or "coupled" to another element, it should be understood that the element may be directly connected or coupled to the other element, or another element may exist therebetween. On the other hand, when it is mentioned that a certain element is "directly connected" or "directly coupled" to another element, it should be understood that no other element is present in the middle.

The terms used in the present application are only used to describe specific embodiments and are not intended to limit the present invention. The singular expression includes the plural expression unless the context clearly states otherwise. In the present application, it should be understood that terms such as "comprise", "include, or "have" are intended to designate that a feature, number, step, operation, component, part, or combination thereof described in the specification exists and do not preclude a possibility of existence or addition of one or more other features, numbers, steps, operations, components, parts, or combinations thereof.

Unless defined otherwise, all terms used herein, including technical or scientific terms, have the same meaning as commonly understood by one of ordinary skill in the art to which this invention belongs. Terms such as those defined in commonly used dictionaries should be construed as having a meaning consistent with meanings in the context of the related art and should not be construed in an ideal or excessively formal meaning unless otherwise explicitly defined in the present application.

Hereinafter, preferred embodiments of the present invention will be described in more detail with reference to the accompanying drawings. In describing the present invention, in order to facilitate the overall understanding, the same reference numbers are used for the same components in the drawings, and descriptions for the same components are omitted.

FIG. 1 is a diagram illustrating an operation of a processor included in a server according to an embodiment. Specifically, referring to FIG. 1, at least one processor 110 may be a central processing unit (CPU), a graphics processing unit (GPU), or a dedicated unit in which methods according to embodiments of the present invention are performed. Each of a memory 120 and a storage device 160 may be configured to be at least one of a volatile storage medium and a non-volatile storage medium. For example, the memory 120 may be one of a read only memory (ROM) and a random access memory (RAM), and the storage device 160 may be a flash memory, a hard disk drive (HDD), a solid state drive (SSD), or various memory cards such as a micro SD card.

In addition, a server 100 may be included in the server and may include a transceiver 130 performing communication through a wireless network. In addition, the server 100 may further include an input interface device 140, an output interface device 150, a storage device 160, and the like. Each of the components included in the server 100 may be connected to each other by a bus 170 to communicate with each other.

Examples of a user terminal may be devices capable of performing communication such as a desktop computer, a laptop computer, a laptop, a smart phone, a tablet PC, a mobile phone, a smart watch, a smart glass, an e-book reader, an MP (portable multimedia player), a portable game console, a navigation device, a digital camera, a DMB player (digital multimedia broadcasting player), a digital audio recorder, a digital audio player, a digital video recorder, a digital video player, a personal digital assistant (PDA), or the like.

The server may acquire a location of the user terminal from a first external server. In this case, the first external server may mean a server including location information of various devices through GPS. The location of the user terminal may be determined by data obtained from various servers other than the GPS. The user terminal may refer to an electronic device such as a smart phone, a tablet, a computer, or a laptop computer. The server may obtain identification information corresponding to locations and vacant rooms of a plurality of hotels from a plurality of external servers. The plurality of external servers may mean a plurality of servers that provide hotel information. That is, the external server may mean a server including hotel information provided by various companies such as Yanolja and Agoda. The identification information may refer to information that may indicate a hotel and a vacant room. As described in detail later, room classification according to the same hotel may be based on the identification information. At this time, rooms may be sorted and displayed for the same hotel on a display, and vacant room prices of a plurality of hotels may be displayed together on the display. The server may obtain reservation information from the user terminal and transmit to the user terminal whether the reservation corresponding to the reservation information is confirmed. In this case, whether the reservation is confirmed may be obtained from the hotel through the external server.

The server may transmit an output signal to display the same vacant rooms obtained by the classification and prices of the same vacant rooms together on the display.

The server may classify a plurality of hotels by the same hotel from the identification information based on a pre-trained identification model.

In this case, the pre-trained identification model may use machine learning. In this case, a deep learning model may be used, and this may be performed using a machine learning model. In this case, a learning data set may include various voice information and word information, and a supervised learning method may be used. In this case, a deep learning model module may use a deep neural network (DNN) algorithm but is not limited to thereto. A convolutional neural network (CNN) algorithm, a recurrent neural network (RNN) algorithm, a restricted Boltzmann machine (RBM) algorithm, or a deep belief network (DBN) algorithm may be used. Since each algorithm is well-known technology, detailed descriptions thereof will be omitted.

As described later, the server may classify a plurality of vacant rooms by the same vacant room based on a predetermined method.

The identification information may include company name information providing the identification information and hotel name display information in each company. The company name information may mean the name of a company that brokers hotel reservations, such as Agoda. The hotel name display information in each company may be obtained from a plurality of companies. In an embodiment, the hotel name may be displayed differently for each of the plurality of companies. In one embodiment, the first company may display LOTTE HOTEL as LOTTE HOTEL, and a second company may display LOTTE HOTEL as LOTTE HOTEL WORLD, SEOUL. In this case, the system that recognizes them as the same hotel and automates them may be needed. This will be described in detail below.

The server may perform a first classification of classifying the identification information based on the hotel name display information and the company name information in each company and then may perform a second classification of classifying hotels as the same hotel if the names of the hotels are similar by more than a first predetermined threshold based on the hotel name information among the first classified identification information. In one embodiment, if information of 3 hotels is obtained from the first company, information of 4 hotels is obtained from the second company, information of 5 hotels is obtained from the third company, and thus information of a total of 12 hotels is obtained, the first classification may mean classifying identification information of the hotels by each same company such as the first company, the second company, and the third company. After classifying the identification information by each company, the hotels may be classified based on the name of the hotel. As mentioned above, the name of the hotel may be displayed as LOTTE HOTEL; LOTTE HOTEL WORLD, SEOUL; and Lotte Hotel World in Korean (Lotte Hotel Jamsil), and the like. In this case, since the same hotel are displayed with different hotel names, a system that can automatically classify them as the same hotel may be needed.

In the case of "HOTEL", since it may be included in all names, the classification for the same name may be determined based on the number of other matching words except for "HOTEL." In an embodiment, if a hotel name of LOTTE is included, it may be classified based on LOTTE. At this time, since it may be recognized differently due to the presence of the word SEOUL, LOTTE is used as a criterion. At this time, since Lotte written in Korean is the same hotel as LOTTE in English as a criterion for classifying hotels, hotels called in different languages may also be classified as the same hotel. In the case of Lotte Hotel, since there are multiple branches such as a Gangnam branch and a Jamsil branch, it may be necessary to recognize them differently. Therefore, in an embodiment, if there are names of regions, such as Jamsil and Gangnam, in which Lotte Hotels are located, they may be set to be further classified based on these words while using LOTTE as a classification criterion. In other words, the system may be set to recognize a Jamsil branch and a Gangnam branch as different hotels while classifying them as Lotte Hotel. In an embodiment, if Seoul is included in the name, since a Jamsil branch and a Gangnam branch may be located differently, the hotels may be classified by phone number or fax number, as described later.

In other words, the similarity between the names of the hotels by more than a predetermined first threshold may mean that the hotels are classified as the same hotel when they are similar. In addition, the similarity between the names of the hotels by more than the predetermined first threshold may include recognizing Lotte in Korean and LOTTE in English as the same hotel in consideration of syllables and pronunciation of the words and also include recognizing a Gangnam branch and a Jamsil branch as different hotels. For example, as for the "Lotte Hotel Gangnam" and "Lotte Hotel Jamsil", the word "Hotel" is excluded as a classification criterion. Thus, the word "Lotte" is the same, but the words "Gangnam" and "Jamsil" are different. In this case, the word agreement rate of "Lotte Hotel Gangnam" and "Lotte Hotel Jamsil" corresponds to 50% because one of the two words thereof corresponds to each other. Therefore, if the first threshold is 80 or more, the hotels may be classified as different hotels.

The identification information may further include phone number information of the hotel, fax information of the hotel, vacant room information of the hotel in each company, and address information of the hotel. In this case, the phone number information of the hotel and the fax information of the hotel may be configured as a learning data set and are pre-trained through machine learning. Thus, a plurality of hotels may be classified for the same hotel based on the learned data.

In an embodiment, the fax information of the hotel may be input differently in each company. In one embodiment, even if it is a fax of substantially the same hotel, it may be displayed differently. For example, the first company may input as 82-2-1234567, the second company may display as 8221234567 by omitting hyphen "-", and the third company may display as +82-2-1234567. Accordingly, in order to classify it as the same hotel, the following operations may be performed.

In one embodiment, in the case of assuming that the first company is determined as the model number, the second company may be unified by adding hyphen "-" of "82-2-". Whether or not the numbers are the same may be recognized as the same number if portions of numbers that are consecutive to a predetermined digit or more, are identical in a state where the area code of 82 is excluded from the numbers. In the above case, 1234567 out of 8221234567 is the hotel's unique number, except for 82. If 7 consecutive digits, 1234567 out of 21234567, is the same, it may be set to be recognized as the same number. At this time, it may be set as a criterion to exclude hyphen "-" by not recognizing the hyphen "-". At this time, if the first company is set as the standard company, the data of the second and the third company are also converted to 82-2-1234567 and stored and may be output as the same hotel. The phone number may also be used to classify the same hotel with the similar algorithm of the fax number as above.

Vacant room information of each company refers to information on vacant room provided by a plurality of companies. In one embodiment, the vacant room information may mean various concepts and items in the room. For example, the vacant room information may be whether the vacant room corresponds to a luxury room, a deluxe room, or others, whether there is a port in the vacant room, whether there is an air conditioner, whether there is a refrigerator, and whether a bathroom is made of glass.

In one embodiment, even after classifying hotels into the same hotel through the hotel name, the hotel phone number, and the hotel fax number, it is necessary to classify each vacant room. It may be necessary to indicate the vacant room price published by the company. At this time, it may be necessary to display vacant room prices published by various companies to consumers because different prices from the various companies may be displayed even for the same vacant room.

In one embodiment, for the same vacant room, the first company may display the room as a deluxe room with an air conditioner, a refrigerator, and a billiard table at the Gangnam branch of the Lotte Hotel, the second company may display the room as a deluxe room with a billiard table, an air conditioner and may not display the presence of a refrigerator. In this case, it is necessary to recognize them as the same vacant room and display them together. In this case, a billiard table, a deluxe room, and an air conditioner may be set as criteria to be recognized as the same vacant room since a refrigerator is usually found in most hotel rooms. Therefore, when setting the prescribed method, the same vacant room may be set based on the grade of the hotel vacant room such as deluxe room or luxury room, the presence of an air conditioner, and the presence of convenience facilities or entertainment facilities such as a billiards table.

The vacant rooms may also be quantified or scored on a scale through Equation 1. The quantified values or scores may be compared to each other and determined as the same room if a vacant room difference value is less than or equal to a predetermined similarity threshold.

$$S = e^i * \sum_{a=1}^{b} 5 \log 3^b * \tan c^2 \qquad \text{Equation 1}$$

The S may mean a value obtained by quantifying the vacant room through a predetermined method. The i may mean a value of a score corresponding to a convenience or entertainment facility. In an embodiment, in the case of a billiard table or a table-tennis table, a score of 4 or 6 may be placed because it is not common in a hotel room, and in the case of Netflix movie support, a score of 1 may be placed because this benefit may be common. The b may mean the number of general types of items such as general food and beverages, a refrigerator, and an air conditioner existing in the hotel room. That is, the value of a starts from 1 and may be substituted by values expressed as 1, 2, and 3, which correspond to general items such as general food and beverages, a refrigerator, and an air conditioner.

Thus, the portion of the Equation 1, $\Sigma_{a=1}^{b}(5 \log 3^b)$, may mean a numerical value of a score when there are general types of items such as an air conditioner, a refrigerator, a microwave, and a pot for boiling water. In this case, in addition to the air conditioner, the refrigerator and the microwave oven, various items may be input according to the user's settings. The c may mean a numerical value of whether it is a luxury room, a deluxe room, or a standard room. In this case, the c may be tabulated, and a score may be assigned in advance. In one embodiment, a score of 2 may be assigned to a standard room, a score of 6 may be assigned to a deluxe room, and a score of 6 may be assigned to a luxury room.

When determining whether the vacant room is the same room through Equation 1, a more important factor may be used to determine whether the vacant room is the same room. In other words, this method may determine whether vacant rooms are identical by placing weight on characteristic factors such as a billiard table or a table-tennis table, and after placing weight on convenience or entertainment facilities such as a billiard table or a table-tennis table, whether the vacant rooms are the same room may be determined based on a factor among the remaining factors. Through Equation 1, the value of S may be determined in various ways for each vacant room. In one embodiment, if the values of S are 81, 97, 95, 40, 60, 58, and 43, by adjusting the predetermined similarity threshold, vacant rooms with the values of 97 and 95 may be classified as the same room, vacant rooms with the values of 58 and 60 may be classified as the same room, vacant rooms with the values of 40 and 43 may be classified as the same room. In this case, vacant rooms with the values of 81, 40, and 60 may also be determined as different vacant rooms. The vacant room agreement rate may mean a value obtained by a difference of the numerical values.

That is, by adjusting the predetermined similarity threshold above, it is possible to precisely determine whether the vacant room is the same or not. A second threshold may mean a predetermined value for determining whether a plurality of numerical values is the same room. In the above case, since vacant rooms having values with the differences of 2 or 3 are the same vacant room, the second threshold may be set to about 4 or 5. In this case, there may be a section where numbers are concentrated. In this case, more subdivision may be necessary for these numerical values after classifying the values of S. Specifically, the values of S values are classified, these values are classified into a plurality of sections based on specific values, the number of values included in the section are determined, and then the second threshold may be set to be adjusted so that it is inversely proportional to the number of values included in the section.

In one embodiment, in the case of assuming that the values are 30, 32, 35, 38, 40, 43, 44, 47, 48, 50, 55, 57, 61, 68 70, and 81, if the sections are classified into: less than 40; 40 to less than 50; 50 to less than 60; 60 to less than 70; 70 and less than 80; and 80 or more, a section of less than 40 includes 4 values; a section of 40 to less than 50 includes 5 values, a section of 50 to less than 60 includes 3 values, a section of 60 to less than 70 includes 2 values, a section of 70 and less than 80 includes 1 value, and a section of 80 or more includes 1 value. Since the number of the values is the largest in the section of 40 to 50 or less, the second threshold may be tightly adjusted to 1. In addition, the second threshold for the second largest number of the section of 40 and less may be adjusted to 2, the second threshold for the section of 50 to less than 60 may be adjusted to 3, and the second threshold for the other sections may be 4. As described, the second threshold may be set in inverse proportion to the number included in each section.

Figure 2:
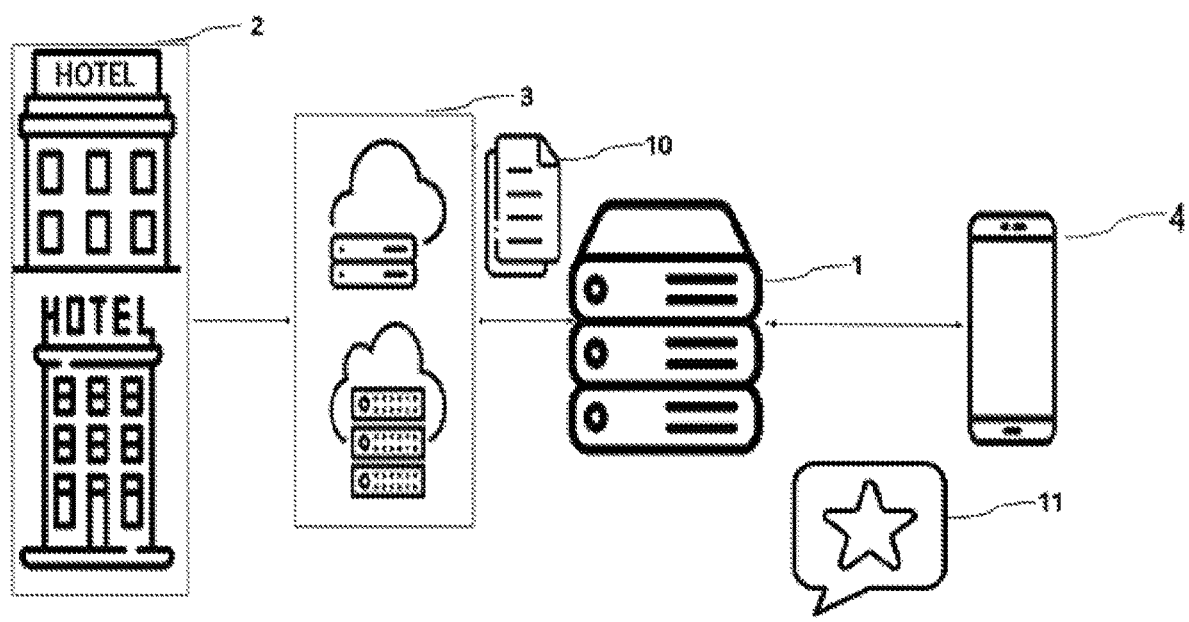
FIG. 2 is a diagram of a hotel reservation system that recommends a vacant room according to an embodiment.

FIG. 2 is a diagram of a hotel reservation system that recommends a vacant room according to an embodiment.

Specifically, referring to FIG. 2, a plurality of servers 3 may obtain vacant room information from a plurality of hotels 2, and a server 1 may obtain identification information for vacant rooms from a plurality of the servers 3. When information on hotel vacant rooms is requested to the server 1 through the user terminal 4, the server 1 may process data based on the identification information 10 and display the vacant room information through the user terminal 4. In this case, information on the vacant rooms may be provided to consumers so that they may perform reasonable consumption. That is, the system classifies the vacant rooms by the same hotel and displaying prices suggested by various companies for vacant rooms even within the same hotel.

After confirming the hotel reservation, the server 1 may recommend information about a cheap vacant room while transmitting information about the reserved vacant room to the consumer. In addition, the server 1 may provide a recommendation notification 11 for recommending a user-customized vacant room or a reservation change notification for notifying a reservation change by quantifying a rating according to reviews or a score according to a user's preference.

Figure 3:
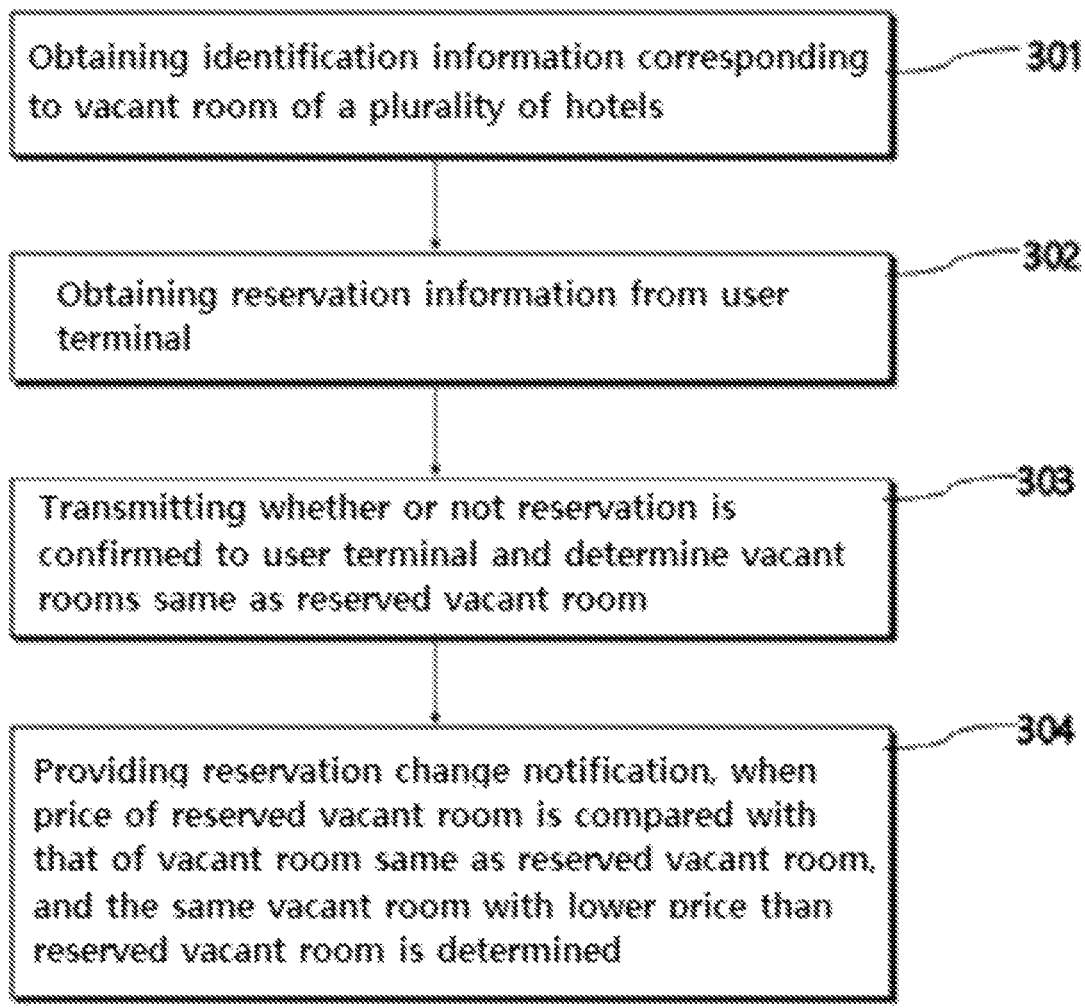
FIG. 3 is a flowchart illustrating an operation of determining vacant rooms that are same as a reserved vacant room and providing a notification when determining a vacant room with a lower price than the reserved vacant room among the same vacant rooms according to an embodiment.

FIG. 3 is a flowchart illustrating an operation of determining vacant rooms that is same as a reserved vacant room and providing a notification when determining a vacant room with a lower price than the reserved vacant room among the same vacant rooms according to an embodiment.

Specifically, referring to FIG. 3, the server obtains reservation information from the user terminal, transmits whether the reservation corresponding to the reservation information is confirmed to the user terminal, obtains identification information corresponding to vacant rooms of the plurality of hotels from the plurality of external servers; searches for a first vacant room that is available within a predetermined period from a check-in date included in the reservation information based on the identification information until before the check-in date, and provides a reservation change notification through the user terminal, if determining the vacant room with a lower price than that of the reserved vacant room by comparing a price of the reserved vacant room and a price of the first vacant room that is available within the predetermined period from the check-in date. In this case, the predetermined period may be on the same day of a reference date, on which the user makes a reservation, may be one day before or after the reference date, and in addition, various periods may be set by the user's setting. The reservation change notification may notify that the existing reservation has been canceled and another reservation for a vacant room with low price has replace. That is, the reservation change notification may be set to provide a notification by which the user terminal may receive an input of whether to change the reservation, like the reservation change possibility notification.

The server may obtain the identification information corresponding to the vacant room of the plurality of hotels in a step 301, obtain the reservation information from the user terminal in a step 302, transmit whether or not the reservation is confirmed to the user terminal and determine vacant rooms same as the reserved vacant room in a step 303, and when the price of the reserved vacant room is compared with that of the vacant room same as the reserved vacant room, and the same vacant room with a lower price than the reserved vacant room is determined, a reservation change notification may be provided in a step 304.

Figure 4:
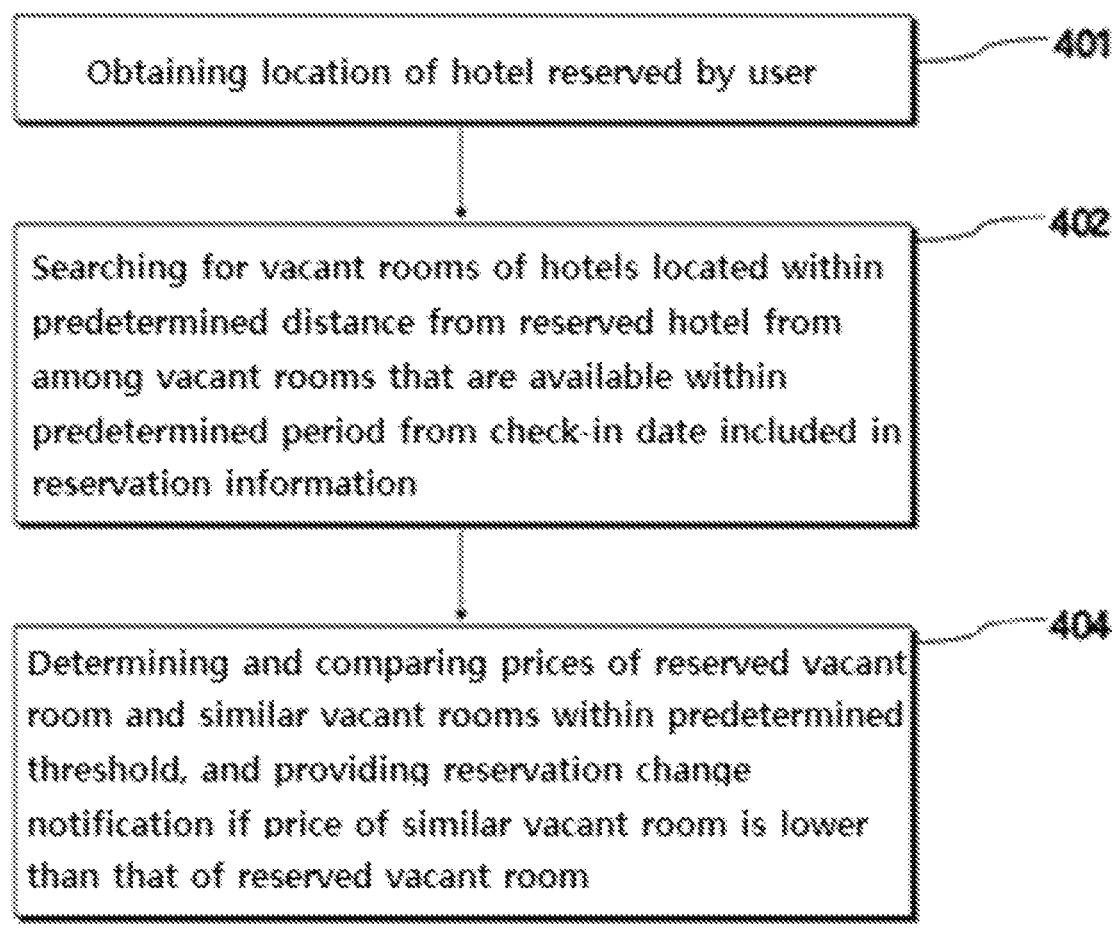
FIG. 4 is a flowchart illustrating an operation of determining a vacant room similar to a reserved vacant room according to an embodiment.

FIG. 4 is a flowchart illustrating an operation of determining a vacant room similar to a reserved vacant room according to an embodiment.

Specifically, referring to FIG. 4, the server may determine a vacant room that is same as the reserved vacant room from among the first vacant room that is available within the predetermined period from the check-in date based on the identification information and may determine the vacant room with the lower price in such a way that if there is a penalty for canceling the reserved vacant room, a total of the price of the vacant room with the lower price and the penalty is lower than the price of the reserved vacant room. The penalty for canceling the reserved vacant room may vary depending on date and time to cancel. At this time, even though the vacant rooms indicate the same room, since each company that provides information on that vacant room may measure prices differently, price information on the vacant room may be obtained from various companies. If the vacant room with a price lower than the price of the reserved vacant room is determined, it is determined whether the difference between the price of the reserved vacant room and the price of the vacant room with a lower price than the reserved vacant room at the time of determination is greater than the penalty at the time of determination. The reservation change may be useful only if the difference is larger than the penalty, and in this case, the reservation change notification may be provided.

The server may acquire a location of the hotel reserved by a user in a step 401, search for vacant rooms of hotels located within a predetermined distance from the reserved hotel from among the vacant rooms that are available within the predetermined period from the check-in date included in the reservation information in a step 402, determine and compare a price of the reserved vacant room and prices of similar vacant rooms within the predetermined threshold, and provide the reservation change notification through the user terminal if the price of the similar vacant room within the predetermined threshold is lower than the price of the reserved vacant room in a step 404.

Figure 5:
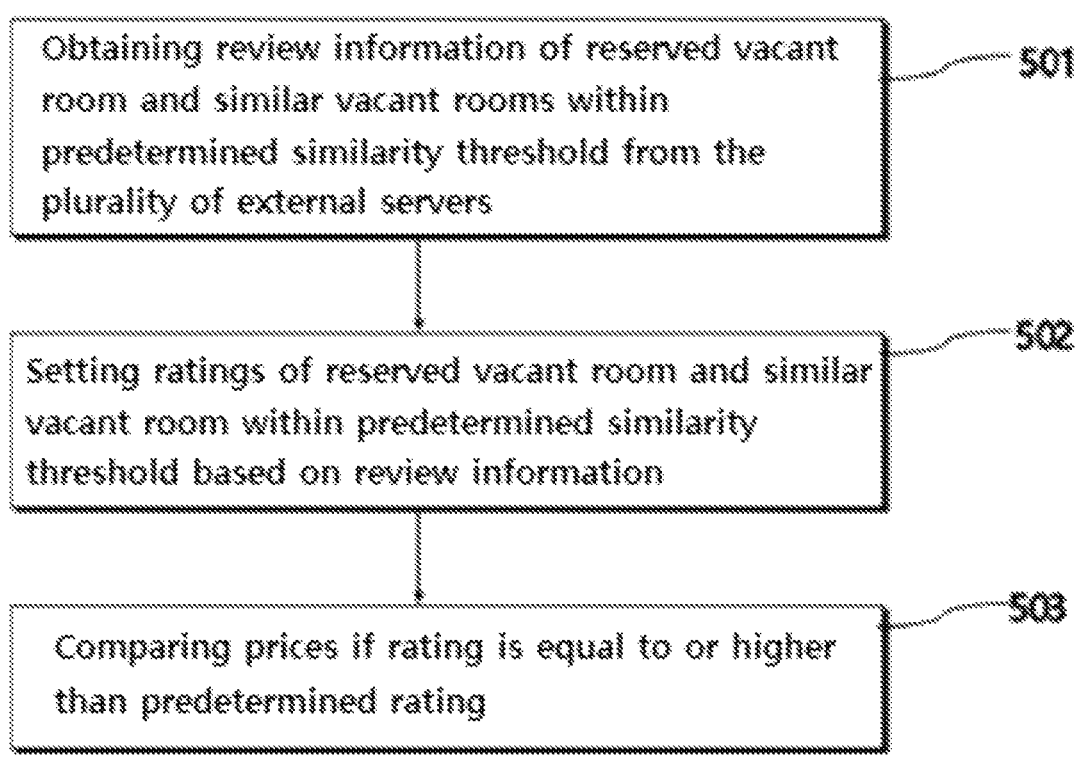
FIG. 5 is a flowchart illustrating an operation of comparing between prices of vacant rooms similar to a reserved vacant room by setting ratings of the vacant rooms according to an embodiment.

FIG. 5 is a flowchart illustrating an operation of comparing between prices of vacant rooms similar to a reserved vacant room by setting ratings of the vacant rooms according to an embodiment.

Specifically, referring to FIG. 5, the server may acquire a location of the hotel reserved by a user, search for vacant rooms of a hotel located within a predetermined distance from the hotel reserved by the user from among first vacant rooms that are available within the predetermined period from the check-in date, determine second vacant rooms similar to the reserved vacant room reserved by the user within a predetermined similarity threshold determine, and compare a price of the reserved vacant room and prices of second vacant rooms within the predetermined similarity threshold. In addition, the server may obtain review information of the second vacant rooms similar to the reserved vacant room within the predetermined similarity threshold from the plurality of external servers, set ratings of the second vacant rooms similar to the reserved vacant room within the predetermined similarity threshold based on the review information, and compare the price of the reserved vacant room and the prices of the second vacant rooms if the ratings are above a predetermined rating. In this case, Equation 1 may be used to find the similar second vacant rooms within the predetermined similarity threshold. A method of setting the ratings may be based on Equation 2 below.

$$T = \sum_{j=1}^{z}\sum_{n=1}^{y} w_{jn} * \ln k,$$

$$\text{if } (r_n > q, w_n = r_n * m \mid r_n \leq q, w_n = r_n * -m)$$

Equation 2

The T may mean a numerical value of the rating. The z may mean the number of a plurality of external servers. The y may mean the number of reviews included in one external server. The w may mean a value obtained by multiplying the star rating by the number of words of a corresponding review. The Q may mean a value that serves as a criterion for discriminating whether the corresponding review is positive or negative. The q may be set by the user. The r may mean the star rating or the numeral rating of the corresponding review. The m may mean the number of words.

As an example, if a criterion for the q is 3 stars in a rating system where the highest level of satisfaction is 5 stars, and there are many words and 5 stars in a review, it may mean that the review for the vacant room is very good. Therefore, that vacant room is given weighting from it and obtains a good numerical value. On the other hand, if there is a star and a lot of words in a review, it may mean the review for the vacant room is very negative, and thus, a negative numerical value is derived by adding a minus value (−). The K may mean a numerical value assigned to the number of photos included in the corresponding review. This may be set to be tabulated by the user's setting in advance.

According to an embodiment, a numerical value may be set such as 10 for one picture and 30 for two pictures. In a situation of $i_n > q$, the number of photos is higher, it may mean a very high positive number as a review with a lot of positive opinion, and in a situation of $i_n \leq q$, the large number of photos may mean a really negative review. Therefore, detailed ratings may be obtained through positive and negative reviews using Equation 2. By setting a rating through Equation 2 and comparing prices only when the rating is higher than or equal to a predetermined rating, it is possible to reserve a hotel vacant room with a high rating.

That is, the server may obtain review information of the reserved vacant room and the similar vacant rooms within the predetermined similarity threshold from the plurality of external servers in a step 501 and setting ratings of the reserved vacant room and the similar vacant room within the predetermined similarity threshold based on the review information in a step 502, and if the rating is equal to or higher than the predetermined rating, the price comparison may be performed in a step 503.

Figure 6:
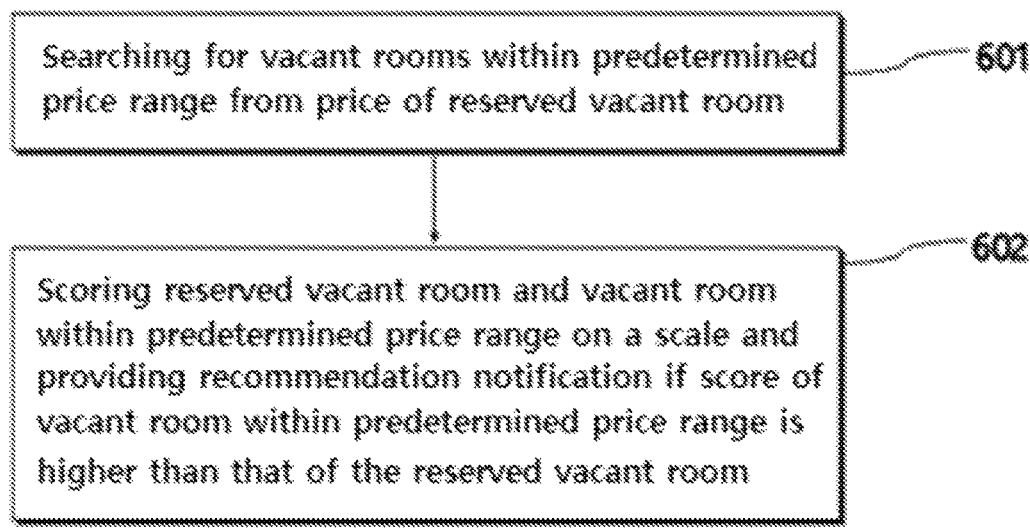
FIG. 6 is a flowchart illustrating an operation of recommending a vacant room by quantifying a third vacant room within a predetermined price range as a score according to an embodiment.

FIG. 6 is a flowchart illustrating an operation of recommending a vacant room by quantifying a third vacant room within a predetermined price range as a score according to an embodiment.

Specifically, referring to FIG. 6, the server may search for a third vacant room within a predetermined price range from the price of the reserved vacant room, obtain a user's preference information, scoring the reserved vacant room of the user and the third vacant room within the predetermined price range based on the preference information on a scale, and provide a recommendation notification to the user terminal if a score of the third vacant room within the predetermined price range is higher than that of the reserved vacant room of the user. The preference information may mean preference factors such as a price of a vacant room, a location of a hotel, a class of a room, the number of bedrooms and bathrooms, and the number of beds as conditions preferred by the user. The server may provide a recommendation notification to the user terminal when the third vacant room within the predetermined price range has a higher score than that of the vacant room reserved by the user. The reservation change notification may be different from the recommendation notification because it is only based on the price of the vacant room. The predetermined price range may be set by the user. Scoring the third vacant room on a scale may be based on Equation 3.

$$G = \sum_{v=1}^{u} f_v * p_v$$

Equation 3

The G may mean a value obtained by quantifying or scoring a vacant room based on user preference information. The u may mean the number of preference factors preferred by the user.

The f may mean weighting corresponding to a preferred factor, and the p may mean a value of a matching rate of the preference factor. The matching rate value of the preference factor may be tabulated in advance and stored.

As an embodiment, if the user prioritizes on a location of the hotel, the weighting of f according to the location of the hotel may increase, and a score may be set differently as the p according to the distance away from the most important location for the user. If the user prefers a hotel within 1 km from his or her important location, and 1 km is a reference distance, a matching rate may decrease by 10% for every 0.5 km further away from the important location. In this case, if a hotel is located 1.5 km away from the important location, the matching rate could be 90% depending on a corresponding setting value, and if a hotel is located 5 km away, the matching rate could be 20%.

As an embodiment, if the user prioritizes a price the most, the weighting of f according to the vacant room price may increase, and to score may be set differently as the p according to how much more expensive it is from the most satisfactory price. If the user sets it as 100% when there is no difference among the vacant room prices, the matching rate may drop by 5% every time the price increases by 1000. In this case, if the price of the reserved vacant room is 50,000 won, 50,000 won may correspond to a 100% matching rate. Accordingly, 60,000 won may correspond to 50% matching rate, 65,000 won may correspond to 25% won matching rate, and 70,000 won and more may correspond to 0% matching rate.

Through Equation 3, the vacant room customized according to the user's preference may be quantified or scored on a scale, and recommendation may be set to be provided only when the numerical value of the vacant room is higher than that of the reserved vacant room.

That is, the server may search for vacant rooms within a predetermined price range from the price of the reserved vacant room in a step 601, score the reserved vacant room of the user and the third vacant room within the predetermined price range on a scale, and provide a recommendation notification to the user terminal if a score of the third vacant room within the predetermined price range is higher than that of the reserved vacant room of the user in a step 602.

Figure 7:
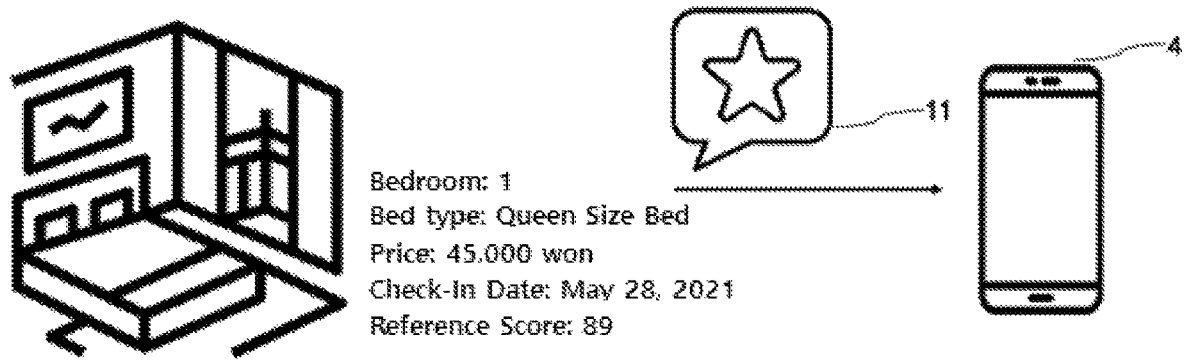
FIG. 7 is a flowchart illustrating an operation of providing a recommendation notification according to an embodiment.

FIG. 7 is a flowchart illustrating an operation of providing a recommendation notification according to an embodiment.

Specifically, referring to FIG. 7, even if the user has previously reserved a vacant room, the system further provides a recommended vacant room based on the user's preference information. For example, if the user is in a state of having booked a hotel for 40,000 won from the check-in date of May 28, 2021, and the obtained preference information of the user indicates that the user prefers a queen size bed while the currently reserved vacant room has a standard size bed, the user may prefer another vacant room with a larger bed size even if the price of the vacant room with the larger bed size is little high. In this case, if the server searches and finds a new vacant room with a price of 45,000 won for a queen size bed among hotels in the adjacent location, and the preference score of the new vacant room is scored to be higher than an 85 preference score of the previously booked room through Equation 3 above, the recommended recommendation notification 11 may be transmitted to the user terminal 4.

The methods according to the present invention may be embodied in the form of program command that may be executed by various computer means and recorded in a computer-readable medium. The computer-readable medium may include each of program command, data file, data structure, and others, or a combination thereof. The program commands recorded on the computer-readable medium may be specially designed and configured for the present invention or may be known and available to one skilled in the art of computer software.

Examples of the computer-readable medium may include hardware devices specially configured to store and execute program commands, such as ROM, RAM, flash memory, and the like. Examples of the program commands may include not only machine language codes such as those generated by a compiler but also high-level language codes that may be executed by a computer using an interpreter or the like. The hardware device described above may be configured to operate with at least one software module to perform the operations of the present invention, and vice versa.

In addition, the method or the device may be embodied by combining all or part of its configuration or function or may be embodied in such a way that its configuration or function is separated.

Although the present invention has been described with reference to the preferred embodiments, it should be understood that those skilled in the art can variously modify and change the present invention within the scope without departing from the spirit and scope of the present invention as described in the claims below.

DESCRIPTION OF REFERENCE NUMBERS

1: Server
2: A plurality of hotels
3: A plurality of external servers
4: User terminal
10: Identification information
11: Recommendation notification

What is claimed is:

1. A method of hotel reservation that is performed by a server, the method of hotel reservation comprising:
   obtaining reservation information of a vacant room from a user terminal;
   transmitting to the user terminal whether or not a reservation corresponding to the reservation information is confirmed;
   obtaining identification information corresponding to vacant rooms of a plurality of hotels from a plurality of external servers;
   searching for first vacant rooms that are available within a predetermined period from a check-in date included in the reservation information based on the identification information until before the check-in date;
   determining a total price of a vacant room of the first vacant rooms is lower than a price of the reserved room, the total price being an amount of a penalty for canceling the reserved room and a price of the vacant room; and
   in response to the total price of the vacant room being lower than the price of the reserved room, cancelling the reservation of the reserved room, making a reservation of the vacant room with the total price lower than the price of the reserved room, and providing a reservation change notification through the user terminal,
   wherein the providing a reservation change notification through the user terminal comprises:
     acquiring a location of a hotel reserved by a user;
     searching for a vacant room of a hotel located within a predetermined distance from the hotel reserved by the user from among the first vacant rooms, based on the identification information;
     determining second vacant rooms similar to the reserved room reserved by the user within a predetermined similarity threshold;
     comparing the price of the reserved room and the total prices of the second vacant rooms within the predetermined similarity threshold; and
     providing the reservation change notification through the user terminal in response to the total price of one of the second vacant rooms within the predetermined similarity threshold being lower than the price of the reserved room,
   wherein the determining second vacant rooms similar to the reserved room reserved by the user within a predetermined similarity threshold, comprises:
     quantifying each of the reserved room and the second vacant rooms through a predetermined method based on a grade of a room, presence of an air conditioner, and presence of convenience facilities or entertainment facilities; and
     determining the second vacant rooms having a quantified value whose difference from a quantified value of the reserved room is less than or equal to the predetermined similarity threshold,
   wherein the comparing the price of the reserved room and the total prices of the second vacant rooms within the predetermined similarity threshold, comprises:
     obtaining review information of the second vacant rooms similar to the reserved room within the predetermined similarity threshold from the plurality of external servers;
     setting ratings of the second vacant rooms similar to the reserved room within the predetermined similarity threshold based on the review information; and
     comparing the price of the reserved room and the total prices of the second vacant rooms in response to the ratings being above a predetermined rating,
   wherein the searching for first vacant rooms comprises:

searching for a third vacant room within a predetermined price range from the price of the reserved room;

obtaining a user's preference information; and scoring the reserved room of the user and the third vacant room within the predetermined price range on a scale based on the preference information and providing a recommendation notification to the user terminal in response to a score of the third vacant room within the predetermined price range being higher than that of the reserved room of the user, the scoring being based on an equation $G=\Sigma_{v=1}^{u} f_v * p_v$ wherein G is a value obtained by quantifying or scoring a room based on the user's preference information, u is a number of preference factors preferred by the user, f is a weighting corresponding to a preferred factor, and p is a value of a matching rate of the preference factor.

* * * * *